(12) United States Patent
Raether et al.

(10) Patent No.: US 8,118,900 B2
(45) Date of Patent: Feb. 21, 2012

(54) DUST COLLECTOR AND METHODS

(75) Inventors: Thomas Donald Raether, St. Louis Park, MN (US); Douglas Wersal, Champlin, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 259 days.

(21) Appl. No.: 12/570,669

(22) Filed: Sep. 30, 2009

(65) Prior Publication Data
US 2011/0072972 A1    Mar. 31, 2011

(51) Int. Cl.
*B01D 46/02* (2006.01)
(52) U.S. Cl. .............................. 55/302; 95/280
(58) Field of Classification Search .............. 55/283, 55/294, 302, 293; 95/279, 280
See application file for complete search history.

(56) References Cited

U.S. PATENT DOCUMENTS

| | | |
|---|---|---|
| 2,591,198 A | 4/1952 | Ringe |
| 2,748,948 A | 6/1956 | Fricke et al. |
| 2,836,257 A | 5/1958 | Muller |
| 3,095,290 A | 6/1963 | Hockett |
| 3,173,777 A | 3/1965 | Tamny |
| 3,234,714 A | 2/1966 | Rymer et al. |
| 3,325,978 A | 6/1967 | Rymer et al. |
| 3,394,532 A | 7/1968 | Oetiker |
| 3,402,881 A | 9/1968 | Moore et al. |
| 3,487,609 A | 1/1970 | Caplan |
| 3,499,268 A | 3/1970 | Pausch |
| 3,508,383 A | 4/1970 | Humbert, Jr. et al. |
| 3,509,698 A | 5/1970 | Medcalf et al. |
| 3,535,852 A | 10/1970 | Hirs |
| 3,692,184 A | 9/1972 | Miller, Jr. et al. |
| 3,726,066 A | 4/1973 | Colley et al. |
| 3,732,669 A | 5/1973 | Chambers |
| 3,735,566 A | 5/1973 | Laliwala |
| 3,757,497 A | 9/1973 | Ray |
| 3,807,150 A | 4/1974 | Maracle |
| 3,831,354 A | 8/1974 | Bakke |
| 3,853,509 A | 12/1974 | Leliaert |
| 3,874,857 A | 4/1975 | Hunt et al. |
| 3,883,331 A | 5/1975 | Bernard et al. |
| 3,942,962 A | 3/1976 | Duyckinck |
| 4,171,963 A | 10/1979 | Schuler |
| 4,218,227 A | 8/1980 | Frey |
| 4,227,903 A | 10/1980 | Gustavsson et al. |
| 4,251,244 A | 2/1981 | Evenstad |
| 4,272,262 A | 6/1981 | Britt et al. |
| 4,277,260 A | 7/1981 | Browning |
| 4,278,454 A | 7/1981 | Nemesi |
| 4,292,057 A | 9/1981 | Ulvestad et al. |
| 4,306,893 A | 12/1981 | Fernando et al. |

(Continued)

FOREIGN PATENT DOCUMENTS

DE    1 228 130    11/1966

(Continued)

*Primary Examiner* — Duane Smith
*Assistant Examiner* — Minh-Chau Pham
(74) *Attorney, Agent, or Firm* — Merchant & Gould, P.C.

(57) ABSTRACT

A dust collector includes a housing with a tubesheet and at least one filter element. A reverse pulse cleaning arrangement is provided to periodically emit gas pulses into a downstream flow face of the filter element. The reverse pulse cleaning arrangement includes at least Q number of blow pipes directed at the filter element, with Q being an integer of at least 2 or greater and is calculated based on filter length, filter width, pulse over coverage, and the maximum pulse non-coverage.

12 Claims, 8 Drawing Sheets

U.S. PATENT DOCUMENTS

| | | | |
|---|---|---|---|
| 4,395,269 A | 7/1983 | Schuler | |
| 4,504,288 A | 3/1985 | Kreft | |
| 4,578,092 A | 3/1986 | Klimczak | |
| 4,632,680 A | 12/1986 | Klimczak | |
| 4,661,131 A | 4/1987 | Howeth | |
| 4,746,339 A | 5/1988 | Millard | |
| 4,820,320 A | 4/1989 | Cox | |
| 4,909,813 A | 3/1990 | Eggerstedt | |
| 4,955,996 A | 9/1990 | Edwards et al. | |
| 5,002,594 A | 3/1991 | Merritt | |
| 5,062,867 A | 11/1991 | Klimczak | |
| 5,062,872 A | 11/1991 | Williams | |
| 5,062,873 A | 11/1991 | Karlsson | |
| 5,393,327 A | 2/1995 | Chambers et al. | |
| 5,395,409 A * | 3/1995 | Klimczak et al. | 55/302 |
| 5,421,845 A | 6/1995 | Gregg et al. | |
| 5,562,746 A | 10/1996 | Raether | |
| 5,980,598 A | 11/1999 | Horvat | |
| 6,022,388 A * | 2/2000 | Andersson et al. | 55/302 |
| 6,090,173 A | 7/2000 | Johnson et al. | |
| 6,322,618 B1 | 11/2001 | Simms et al. | |
| 6,551,368 B1 * | 4/2003 | Kordas | 55/302 |
| 7,282,075 B2 | 10/2007 | Sporre et al. | |
| 2005/0252178 A1 * | 11/2005 | Richard | 55/302 |
| 2008/0022856 A1 * | 1/2008 | Clements | 95/280 |
| 2008/0127825 A1 | 6/2008 | Raether | |
| 2008/0127826 A1 | 6/2008 | Raether | |
| 2008/0127827 A1 * | 6/2008 | Raether | 95/280 |
| 2008/0127828 A1 | 6/2008 | Raether | |
| 2009/0205445 A1 | 8/2009 | Raether | |

FOREIGN PATENT DOCUMENTS

| | | |
|---|---|---|
| DE | 1 407 933 | 4/1972 |
| DE | 39 05 113 A1 | 8/1990 |
| DE | 196 18 377 A1 | 11/1996 |
| DE | 196 06 508 A1 | 8/1997 |
| EP | 0123 721 A1 | 9/1983 |
| FR | 1 184 609 | 7/1959 |
| FR | 1 413 752 | 11/1964 |
| FR | 1 590 764 | 4/1970 |
| FR | 2 401 690 | 3/1979 |
| GB | 326 047 | 3/1930 |
| GB | 662.358 | 12/1951 |
| GB | 781 194 | 8/1957 |
| GB | 838 523 | 6/1960 |
| GB | 880 043 | 10/1961 |
| GB | 914 187 | 12/1962 |
| GB | 939 641 | 10/1963 |
| GB | 948 705 | 2/1964 |
| GB | 1016556 | 1/1966 |
| GB | 1113154 | 5/1968 |
| GB | 1 220 174 | 1/1971 |
| GB | 1 345 977 | 2/1974 |
| GB | 2 195 558 A | 4/1988 |
| SU | 627841 | 10/1978 |
| WO | WO 2009/124284 | 10/2009 |

* cited by examiner

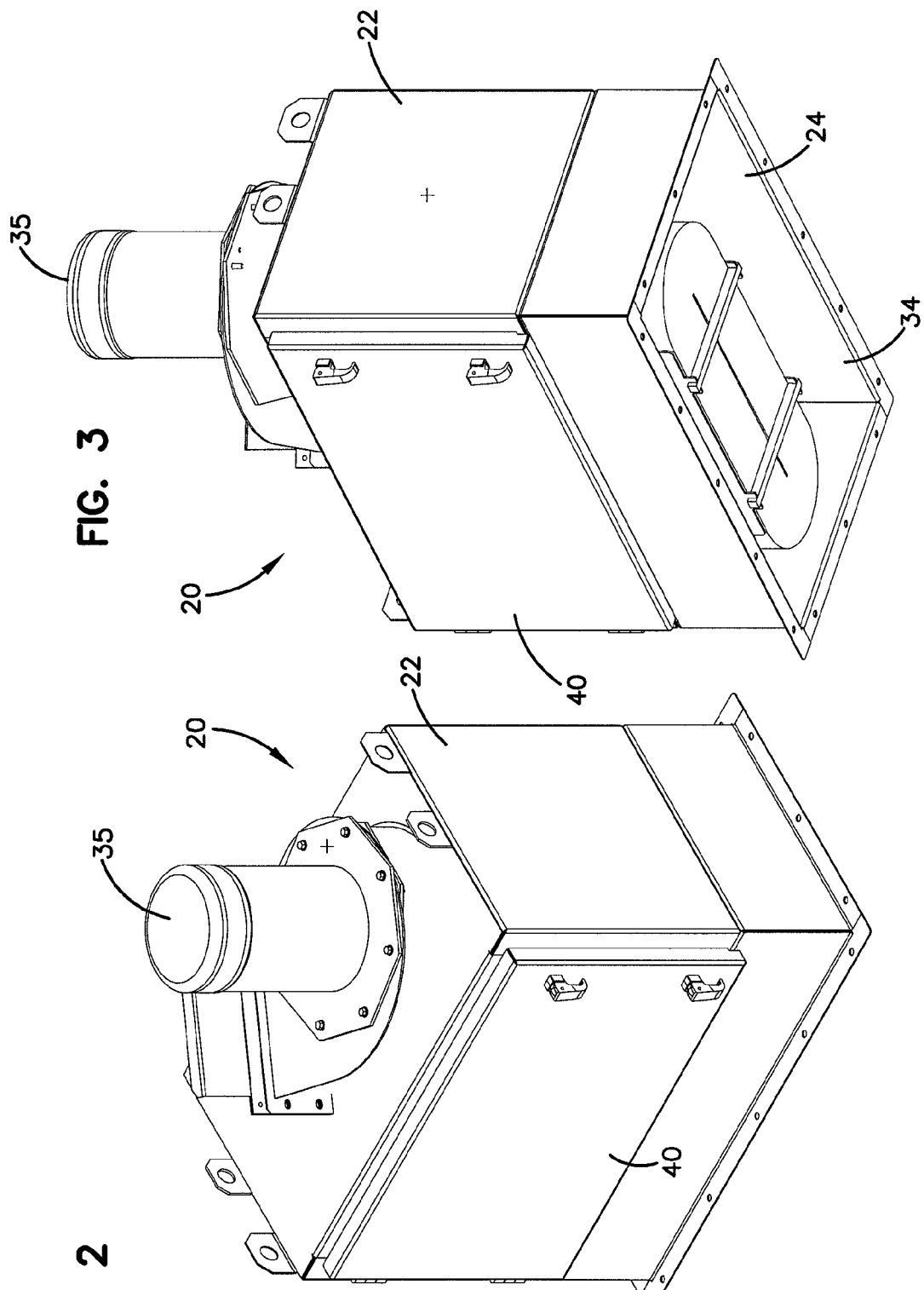

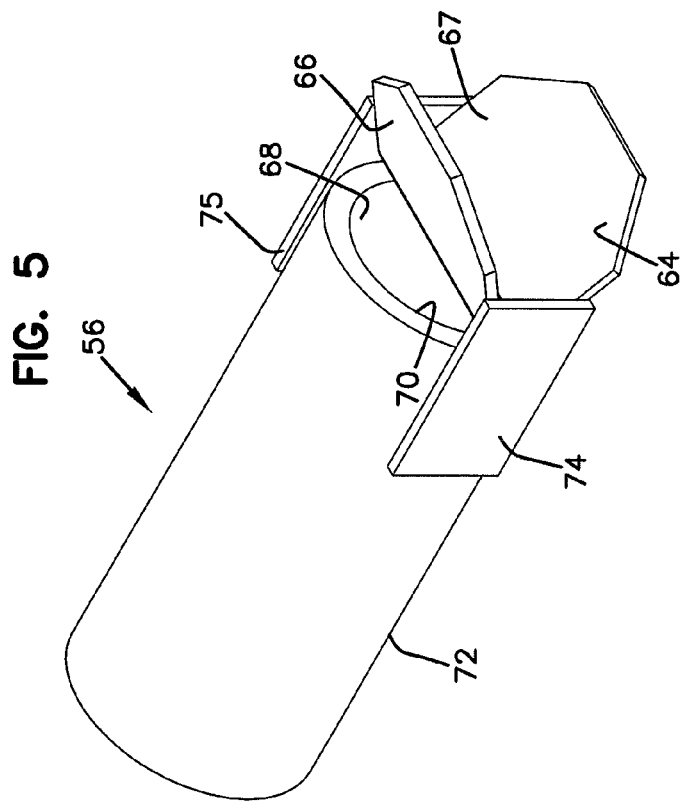
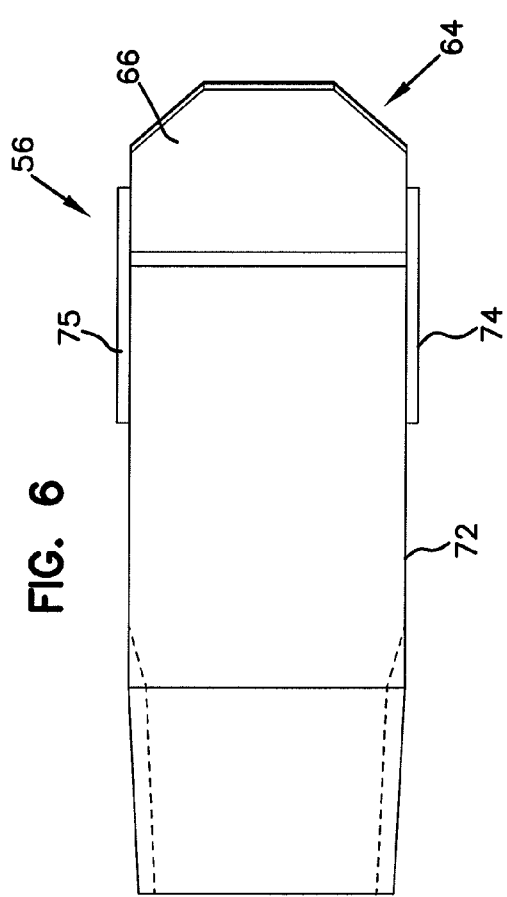
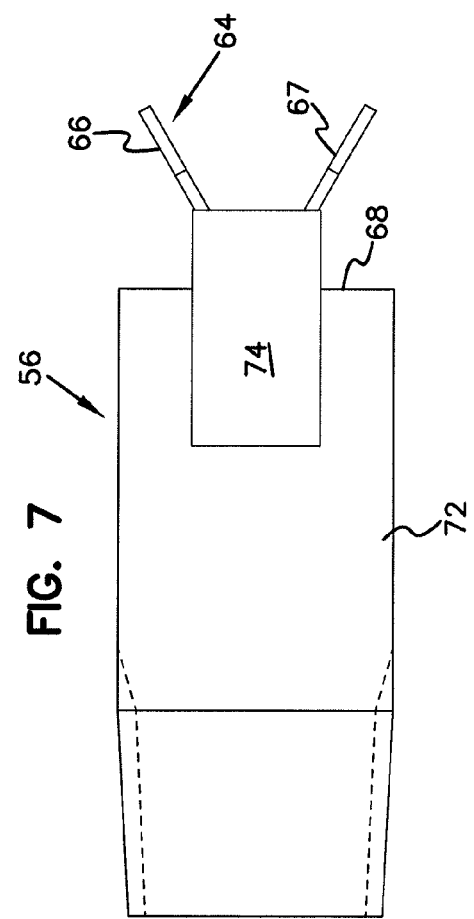

DUST COLLECTOR AND METHODS

TECHNICAL FIELD

This disclosure relates to dust collectors, methods for pulse cleaning filter elements utilizing pressurized gas generators, methods of filtering, and methods of designing dust collectors.

BACKGROUND

Dust collectors include systems that take in unfiltered air, filter it, and exhaust clean air. Dust collectors are used in a variety of environments, including factories, for example. These systems often have one or more filter elements that are periodically changed out. These systems also sometimes use pressurized gas to direct a pulse of gas (air) from the downstream side of the filter element to the upstream side. This helps to remove some of the dust and debris collected on the upstream side of the filter element, which allows the filter element to be used longer before the restriction becomes so high that it needs to be changed. Examples of such air filters assemblies are disclosed in, for example, U.S. Pat. Nos. 6,090,173; 4,218,227; 4,395,269; 5,980,598; 6,322,618; DE 3905113; and Patent Publication U.S. 2006/0112667A1, each of these patent documents being incorporated by reference herein. Improvements in filter elements and dust collectors and methods are desirable.

SUMMARY

A dust collector is provided including a housing, at least one filter element, and a reverse pulse cleaning arrangement. The housing includes a dirty air chamber, a filtered air chamber, a tubesheet between the dirty air chamber and the filtered air chamber, a dirty air inlet in communication with the dirty air chamber, and a clean air outlet in communication with the filtered air chamber. The tubesheet has at least one aperture. The filter element is removably sealed within at least one aperture in the tubesheet. The filter element removes at least some contaminant from the air stream as it flows from the dirty air inlet, into the dirty air chamber, through the filter element and into the filtered air chamber. The filter element comprises a panel filter, which can be pleated media or z-filter media having an upstream flow face and a downstream flow face. Unfiltered air flows from the dirty air chamber through the upstream flow face and into the z-filter media. Filtered air exits the filter element through the downstream flow face to flow into the filtered air chamber. The filter element has a length and a width. The reverse pulse cleaning arrangement includes at least Q number of blow pipes directed at the filter element to periodically emit the gas pulses into the downstream flow face of the filter element. Q is an integer of at least 2 or greater and is calculated based on the filter length, the filter width, the pulse over coverage ($P_{OC}$) and the maximum pulse non-coverage ($P_{NC}$). Specifically, $$Q=L_f/((W_f+2*P_{OC})*(1+(P_{NC}/100))).$$

In another aspect, a method of filtering air using a dust collector is provided. The method includes directing unfiltered air into a dirty air inlet of a dust collector and into a dirty air chamber. Next, there is a step of directing the unfiltered air through a filter element comprising z-media having an upstream flow face and a downstream flow face to result in filtered air, the filter element having a length $L_f$ and a width $W_f$. Next, there is the step of directing filtered air into a filtered air chamber and then out of the dust collector through a clean air outlet. The method further includes periodically pulsing a jet of compressed gas through the downstream flow face with Q number of blowpipes directed at the downstream flow face, wherein Q is an integer at least 2 or greater and $$Q=L_f/((W_f+2*P_{OC})*(1+P_{NC}(/100))))$$

BRIEF DESCRIPTION OF THE DRAWINGS

FIG. 2 is a perspective view of the assembled dust collector of FIG. 1;

FIG. 3 is another perspective view of the dust collector of FIG. 2;

FIG. 5 is a perspective view of one of the blow pipes used in the dust collector of FIGS. 1-4;

FIG. 6 is a top view of the blow pipe of FIG. 5;

FIG. 7 is a side elevational view of the blow pipe of FIG. 5;

DETAILED DESCRIPTION

A. Overview of Dust Collector

Figure 4:
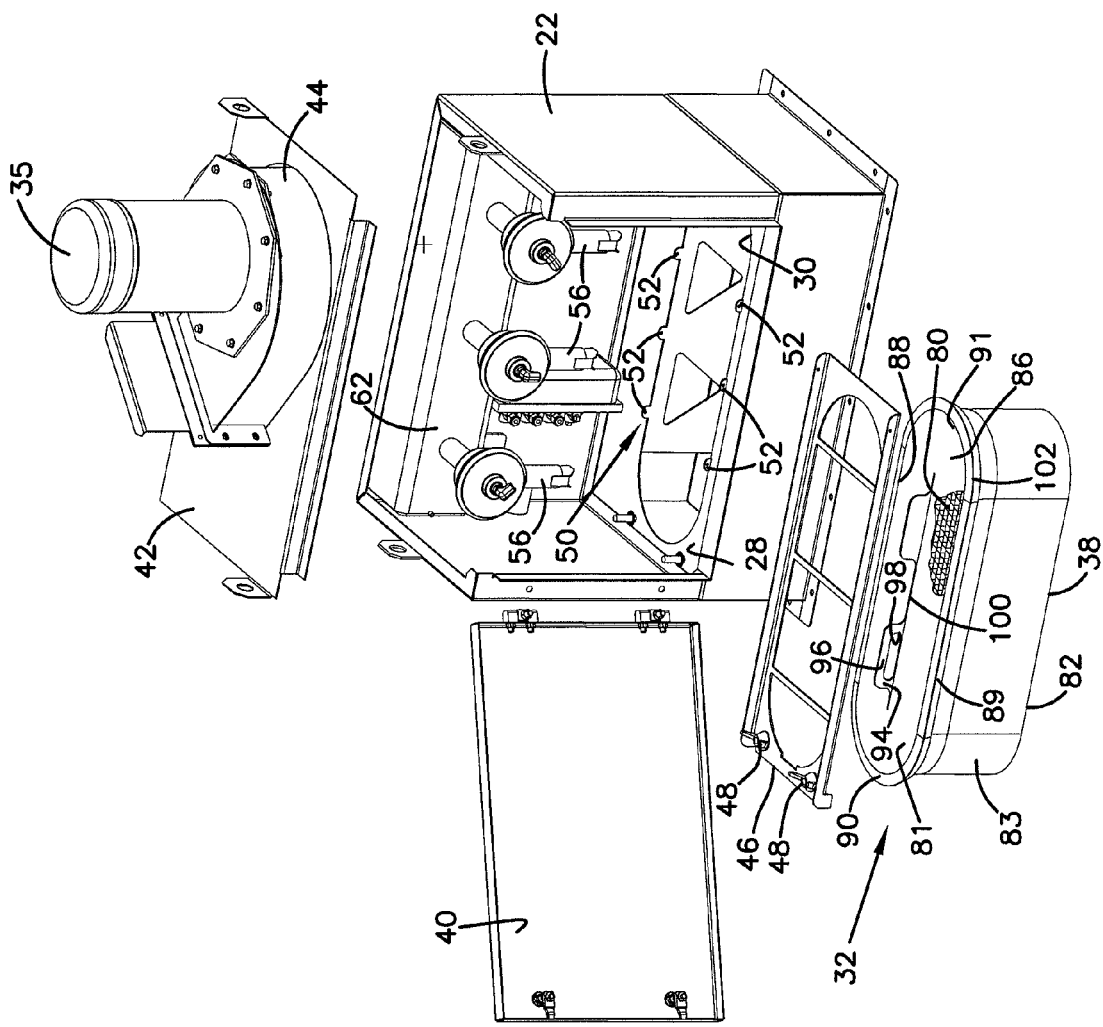
FIG. 4 is an exploded, perspective view of the dust collector of FIGS. 1-3.

In reference to FIGS. 1-4, one embodiment of a dust collector constructed in accordance with principles of this disclosure is illustrated at reference numeral 20. In the embodiment shown, the dust collector 20 includes a housing 22 forming an enclosure with a dirty air chamber 24 (FIG. 3), a filtered air chamber 26, and a tubesheet 28 dividing the housing 22 between the dirty air chamber 24 and the filtered air chamber 26. As can be seen in FIG. 4, the tubesheet 28 defines or includes at least one aperture 30 that will receive a filter element 32. In other embodiments, the tubesheet 28 can define a plurality of apertures, with at least one filter element per aperture.

Figure 1:
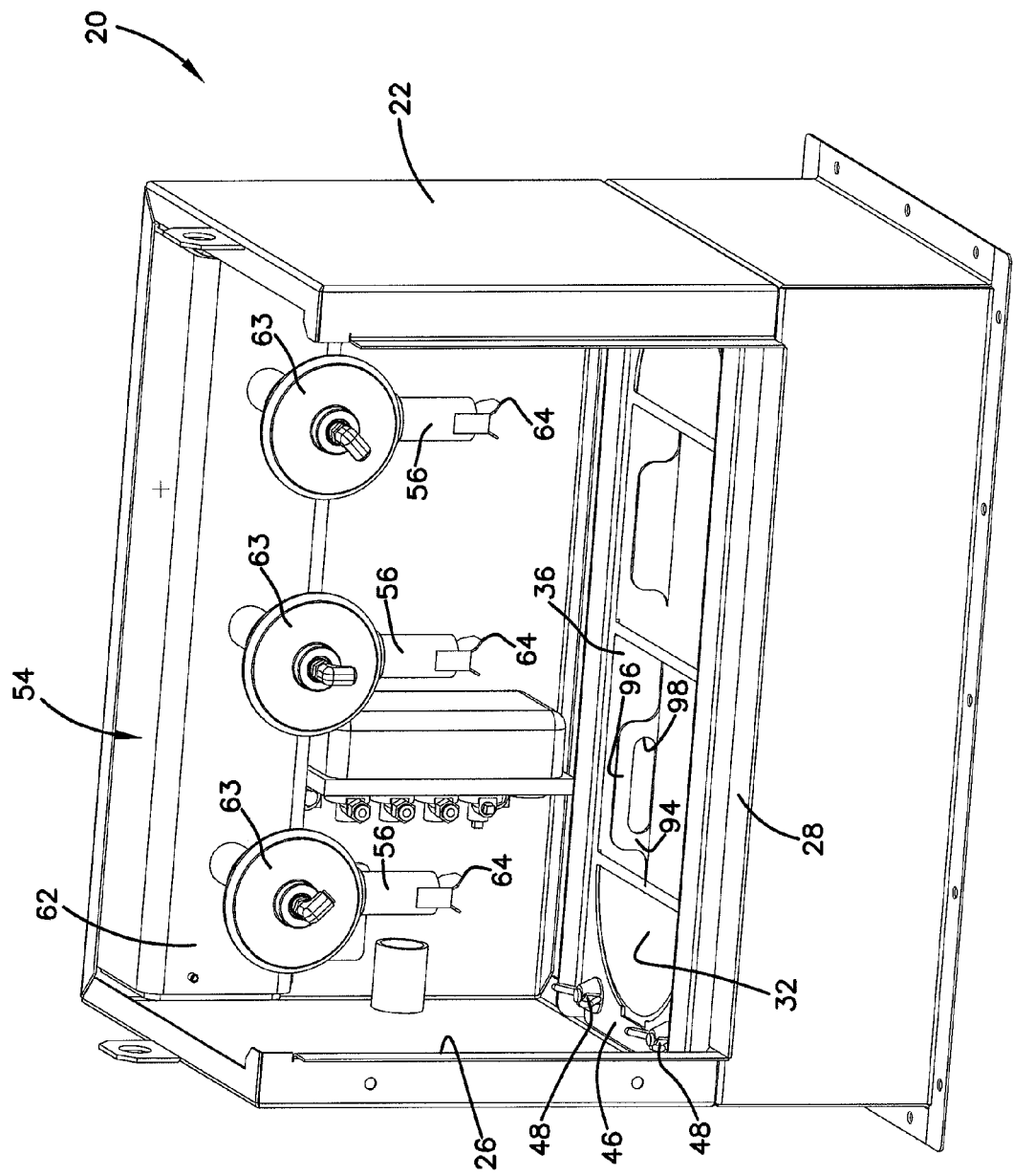
FIG. 1 is a perspective view of one embodiment of a dust collector, with a portion removed to reveal internal components, constructed in accordance with principles of this disclosure.

It should be understood that in FIG. 1, the dust collector 20 has one of the front walls and top walls removed, to facilitate illustration of internal components.

The dust collector housing 22 further includes a dirty air inlet, shown generally at 34, but it should be understood, that the inlet 34 can be a channel through a side of the housing, provided it is in communication with the dirty air chamber 24. A clean air outlet 35 is shown extending from an upper portion of the housing 22, and is in communication with the filtered air chamber 26.

In FIG. 4, an exploded perspective view of the dust collector 20 shows a door 40, which provides access to the filtered air chamber 26. Opening the door 40 allows access to the filtered air chamber and to the filter element 32, such that the element 32 can be removed and replaced when servicing the dust collector 20. Also in FIG. 4, the upper panel assembly 42 is shown, which includes the outlet 35. A blower housing 44 is part of the upper panel assembly, in this embodiment, and holds a blower, which pulls air through the dust collector 20. In use, the filter element 32 removes at least some contaminant from an airstream as it flows from the dirty air inlet 34, into the dirty air chamber 24, through the filter element 32, into the filtered air chamber 26, and then exits the housing 22 through the outlet 35.

In this embodiment, there is a filter element retainer 46. The filter element retainer 46 is operably positioned over the filter element 32 to pinch the gasket 102 of the filter element 32 between and against the retainer 46 and the tubesheet 28 such that the filter element 32 is sealed against the tubesheet 28. In this embodiment, thumb screws 48 are used to tighten the retainer 46 against the tubesheet 28.

As can also be seen in FIG. 4, in this embodiment, the tubesheet 28 includes a flange arrangement 50, which help to position or seat the filter element 32 properly relative to the tubesheet 28. This is discussed further below. In this embodiment, the flange arrangement 50 includes a plurality of spaced flanges, tabs, or projections 52 projecting or extending axially from the tubesheet 28 at the perimeter of the aperture 30.

B. Example Filter Element

As mentioned above, the tubesheet 28 is mounted in the interior of the housing 22. The tubesheet 28 includes a plurality of openings 30. Within each opening 30 is mounted an individual filter element, which in the illustrated embodiment, is a panel-style filter element 32. By the term "panel-style filter element" it is meant an element with filter media in which, in general, fluid to the filtered flows through the filter element in a straight-flow thorough manner. For example, a panel-style filter element can be pleated media, depth media, fluted media, Z-media including a z-filter construction, or mini V-packs. By "Z-media", it is meant media having first and second opposite flow faces with a plurality of flutes, each of the flutes having an upstream portion adjacent to the first flow face (so that the first flow face is an inlet flow face, where air to be filtered flows in) and a downstream portion adjacent to second flow face (so that the second flow face is an outlet flow face, where filter air exits the element), selected ones at the flutes being open at the upstream portion and closed at the downstream portion, while selected ones of the flutes are closed at the upstream portion and open at the downstream portion. The flutes can be straight, tapered, or darted. The flutes extend between the inlet flow face and the outlet flow face. Examples of filter elements with Z-media are found in, for example, U.S. Pat. No. 5,820,646; Patent Publication 2003/0121845; and U.S. Pat. No. 6,350,291, each of these patent documents being incorporated by reference herein.

The term "z-filter construction" as used herein, is meant to refer to a filter construction in which individual ones of corrugated, folded or otherwise formed filter flutes are used to define sets of longitudinal filter flutes for fluid flow through the media; the fluid flowing along the length of the flutes between opposite inlet and outlet flow ends (or flow faces) of the media. Some examples of z-filter media are provided in U.S. Pat. Nos. 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet, together, are used to define media having parallel inlet and outlet flutes; i.e. opposite sides of the fluted sheet operable as inlet and outlet flow regions. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is described in FIG. 11 of U.S. Pat. No. 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467, 521, filed May 2, 2003 and PCT Application US 04/07927, filed Mar. 17, 2004, published Sep. 30, 2004 as WO 2004/082795, incorporated herein by reference. The resulting coiled arrangement generally has, as the outer surface of the media pack, a portion of the facing sheet, as a result. In some instances a protective covering can be provided around the media pack.

The term "corrugated" when used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, any air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces are possible.

In general, the media pack includes appropriate seal material therein, to ensure there is no unfiltered flow of air through the media pack, in extension from front flow face (an inlet flow face) completely through and outwardly from opposite oval face (outlet flow face).

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/0091084 A1, published May 4, 2006, incorporated herein by reference; also comprising flutes extending between opposite flow faces, with a seal arrangement to prevent flow of unfiltered air through the media pack.

FIG. 4 depicts one useful embodiment for the filter element 32 in the collector housing 22. Filter element 32 includes a media pack 80 of Z-media. The media pack 80 has first and second opposite flow faces 81, 82 and a side wall 83 extending between the first and second flow faces 81, 82. In implementation, the first flow face 81 also corresponds to the downstream (outlet) flow face 36, while the second flow face 82 corresponds to the upstream (inlet) flow face 38.

In the embodiment shown, the media pack 80 includes a non-cylindrical pack of media that is a coiled construction 86. In alternative embodiments, the media pack 80 can be a construction of stacked Z-media. The coiled construction 86 has an overall cross-sectional shape that can be oval or race track-shaped. In the embodiment shown, the media pack 80 is race track-shaped in that it has a pair of straight parallel sides 88, 89 joined by rounded ends 90, 91. In other embodiments, the media pack 80 can be round or rectangular, or rectangular with rounded corners.

In general, the filter element 32 includes a handle member 94 extending axially from the first flow face 81. In this embodiment, the handle member 94 includes a projection 96 defining an open aperture 98 sized to accommodate a human hand. The filter element 32 can be made generally in accord with U.S. Pat. No. 6,235,195, incorporated herein by reference.

In this embodiment, the filter element 32 includes a central core 100 embodied as a flat board. The media pack 80 is coiled around the core 100. The core 100 projects above the first flow face and defines the handle member 94 for manipulating the filter element 32.

The filter element 32 further includes a gasket 102. The gasket 102 is secured to the side wall 83. In preferred implementations, the gasket 102 is molded directly to the side wall 83 of the media pack 80. In other embodiments, the gasket 102 can be pre-made through, for example, an extrusion process and then attached to the side wall 83 of the media pack 80 by glue or an adhesive.

Figure 11:
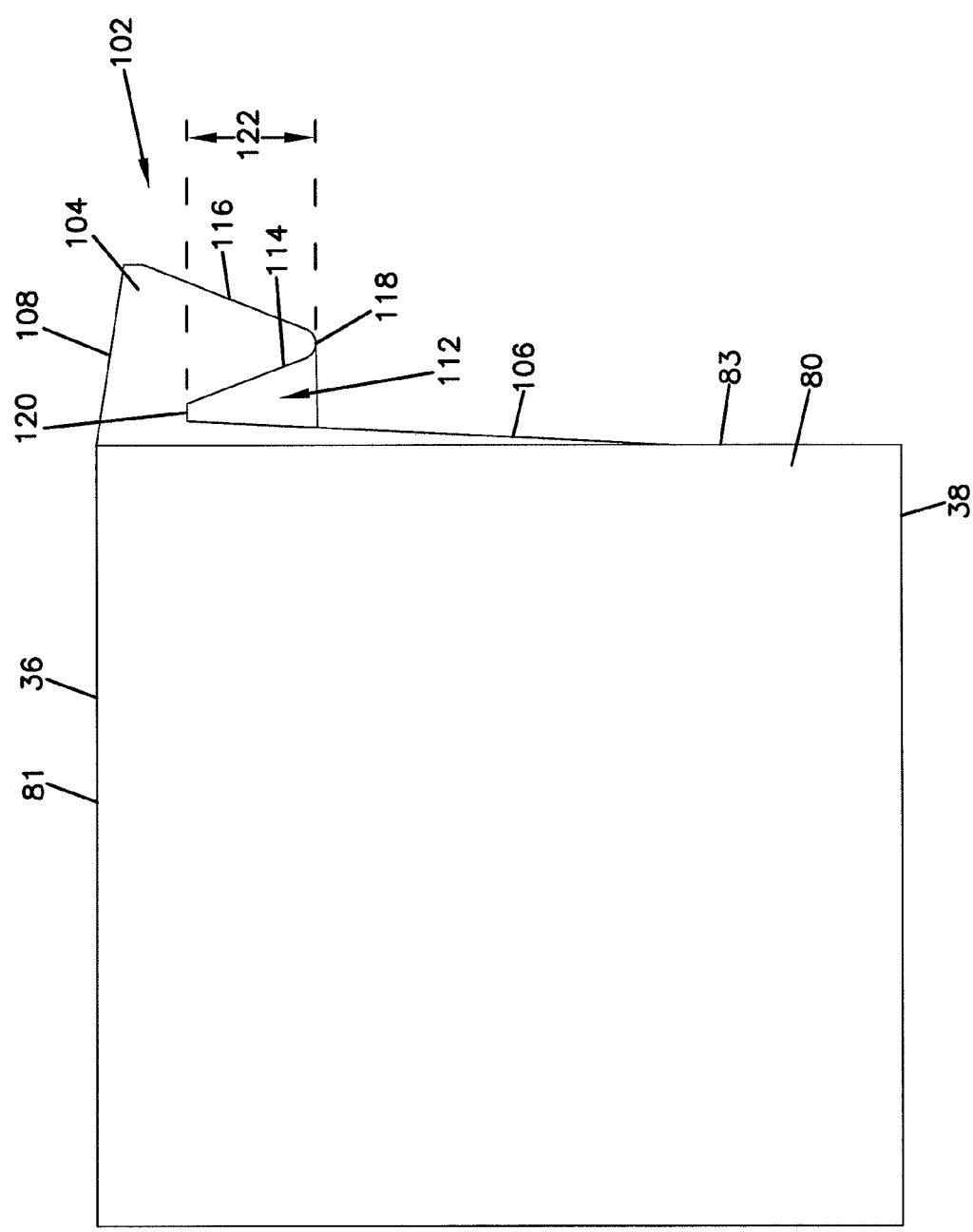
FIG. 11 is a schematic, side elevational view of a portion of the filter element used in the dust collector of FIGS. 1-4.

FIG. 11 depicts one example gasket 102. In the example shown, the gasket 102 has a sealing portion 104 and an attachment portion 106. The attachment portion 106 is the part of the gasket 102 that is directly secured to the side wall 83 of the media pack 80. The sealing portion 104 is the part of the gasket 102 that is compressed against the tubesheet 28 to form a seal with the tubesheet 28.

In the embodiment shown, the sealing portion 104 has a flat surface 108. In this example, the gasket 102 defines an undercut 112 between the attachment portion 106 and the sealing portion 104. As can also be seen in FIG. 11, the sealing portion 104 includes a first angled surface 114 and a second angled surface 116. The first and second angled surfaces 114, 116 slant toward each other to meet an apex 118. The first angled surface 114 and the attachment portion 106 are joined at a base 120. The first angled surface 114 extends from the attachment portion 106 at the base 120 to the apex 118, while the second angled surface 116 extends from the flat surface 108 to the apex 118. The undercut 112 is defined as a gap between the first angled surface 114 and the attachment portion 106. In the embodiment shown, the attachment portion 106 includes an extension that extends from the surface 108 down past the apex 118.

In the embodiment shown, the undercut 112 is defined by a vertical distance 122 from the base 120 to the apex 118, or end of the first angles surface 114 shown. The flat surface 108 slopes downward and away from the first flow face 81 at an angle that is greater than zero degrees and less than 20 degrees. The undercut 112 receives the flange arrangement 50 projecting or extending from the tubesheet 28, which helps to properly locate or seat the filter element 32 in the tubesheet 28.

In use, the element 32 is installed in dust collector 20 in a manner such that the downstream flow face 36 is about even with the tubesheet 28 or is less than 0.5 inches recessed from the tubesheet 28, inclusive. The filter element 32 can be cleaned by periodically pulsing a jet of fluid or gas into the downstream flow face 36 to cause at least some particulate material on the upstream side 38 of the Z-media pack 80 to be removed from the media pack 80.

C. Reverse Pulse Cleaning Arrangement

In accordance with principles of this disclosure, a reverse pulse cleaning arrangement 54 is constructed and arranged to periodically emit a pulse of gas into the downstream flow face 36 of the filter element 32 to exit through the upstream flow face 38, which helps to at least partially clean and remove built up dust in the filter element 32. This allows a filter element 32 to have a longer life, than if it were not periodically pulse cleaned. By periodically pulse cleaning the element 32, the element 32 does not prematurely clog full of dust and debris.

In general, the reverse pulse cleaning arrangement 54 will include a number of blow pipes 56 that is an integer of at least 2 or greater, and which is based upon other factors, to be explained below. It has been found that if a single filter element is reverse pulse cleaned by a single blow pipe, this will momentarily stop all of the primary dust collector air flow, as the primary air flow goes from the dirty air chamber 24, through the upstream flow face 38, then through the downstream flow face 36, and finally to the filtered air chamber 26. If a single blow pipe is used, which momentarily stops all of the primary dust collector air flow, this can result in dust flowing back through the system, which can disrupt a process or escape into the surrounding ambient environment. It has been found that advantages gained by using multiple blow pipes directed at a single filter element to lessen the percent of the filter element that is prevented from allowing the continuous flow of the primary system air flow. It has been found that at least two cleaning pulses from two blow pipes that effectively remove 50% of the filter element from operation can be utilized effectively, and advantages gained from 3 or more blow pipes in preferred embodiments. Advantages include greatly increasing the pulse coverage area and stopping the problem of interrupting all primary dust collector air flow.

Figure 9A:
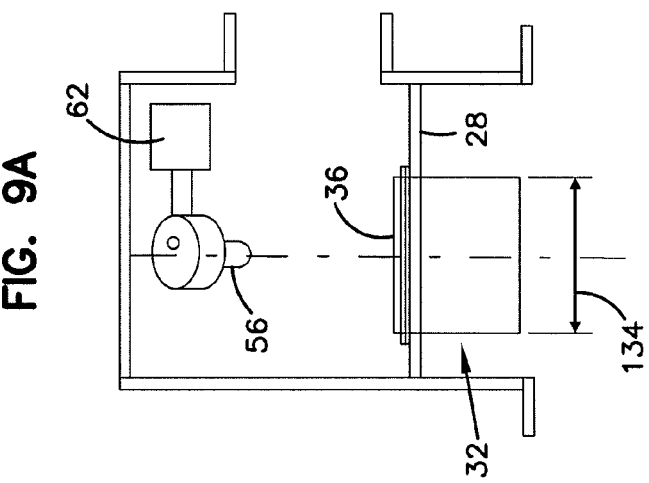
FIG. 9A is a schematic diagram showing a side view of the embodiment of FIG. 9.
Figure 9:
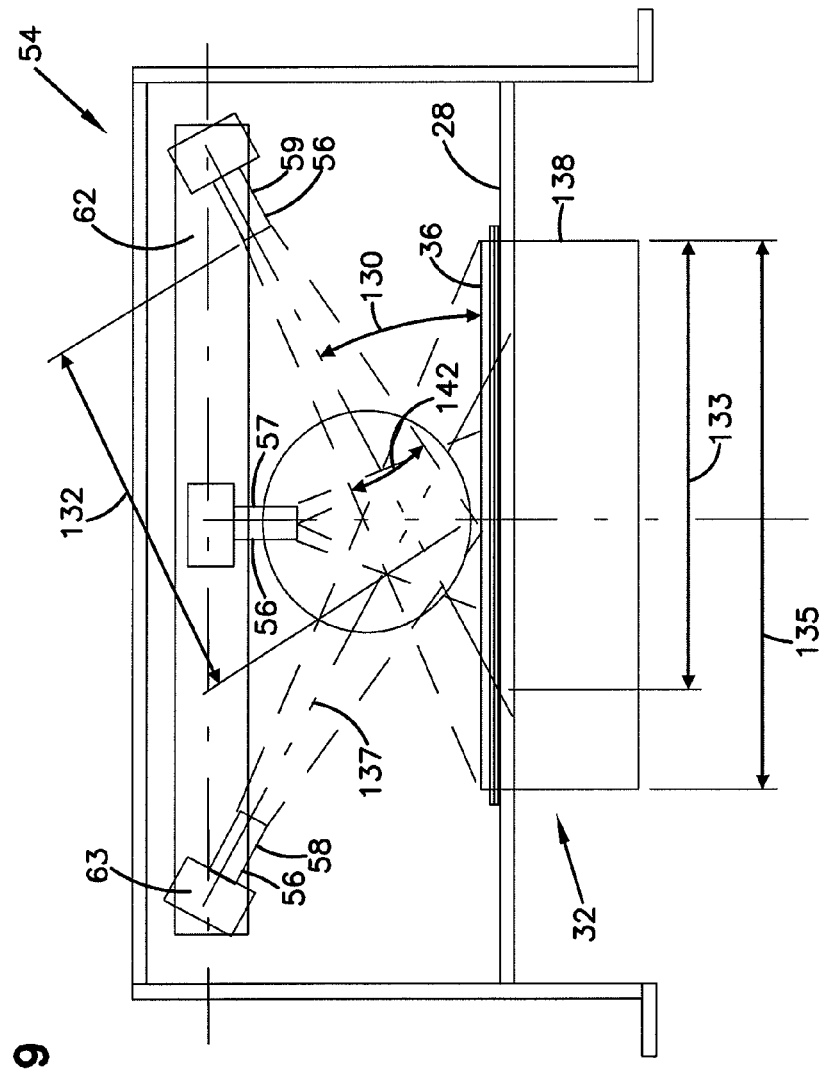
FIG. 9 is schematic diagram showing an alternate embodiment of the reverse pulse cleaning arrangement, which could be utilized in the dust collector of FIGS. 1-4.

The blow pipes 56, in the embodiment of FIG. 1, are directed perpendicular or normal to the downstream flow face 36. In other embodiments, such as that shown in FIGS. 9 and 10, the blow pipes 56 can be directed at a non-orthogonal angle to the downstream flow face 36. In FIG. 9, for example, there are at least 3 blow pipes including a first blow pipe 57, a second blow pipe 58, and a third blow pipe 59. The first blow pipe 57 is directed perpendicular or normal to the downstream flow face 36, while the second blow pipe 58 and the third blow pipe 59 are directed at non-orthogonal angles to the downstream flow face 36. The first blow pipe 57 is between, and in this case, centered between, the second blow pipe 58 and the third blow pipe 59.

The blow pipes 56 are connected to a manifold 62. The manifold 62 is in communication with compressed gas, such as compressed air, and delivers the compressed gas to the blow pipes 56. Valves 63 control the gas between the manifold 62 and the blow pipes 56.

FIGS. 5-7 illustrate one example embodiment of a blow pipe 56. In this embodiment, the blow pipe 56 includes a splitter 64, which comprises first and second blades 66, 67 diverging away from each other from an end mouth 68 of the blow pipe 56. In the embodiment shown, the blow pipe 56 is generally tubular in shape defining an opening 70 to deliver the pulse of gas or air from the manifold 62. The splitter 64 can be secured to the tube 72 of the blow pipe 56 by flanges 74, 75. The splitter 64 divides or splits the pulse into first and second pulse regions to help distribute the compressed air to a larger area of the downstream flow face 36 than if no splitter 64 were used. It should be understood that the splitter 64, although preferred, need not be used. It is used herein to gain advantage.

In other embodiments, the blow pipes 56 could be slotted to generate pulse shapes with non-circular cross sections. An example of slotted blow pipes is described in U.S. 2008/0127828, published Jun. 5, 2008, incorporated herein by reference.

It should be understood that in this embodiment, no accumulators are used with the filter element 32. That is, the filter element 32 is accumulator-free. This is advantageous because accumulators can add expense and cause inconvenience or difficulty when trying to access filter element 32 during servicing. Accumulators add height and in small cabinet sizes, the presence of an accumulator makes filter removal and clamp removal difficult. An accumulator is structure, such as a partial enclosure, wall, projection, or other similar structure that is used adjacent to the downstream flow face 36 to help trap the gas pulse. At least because of the number of blow pipes and the way the blow pipes are arranged relative to the downstream flow face 36, an accumulator is not needed, which provides advantages discussed above.

Figure 8:
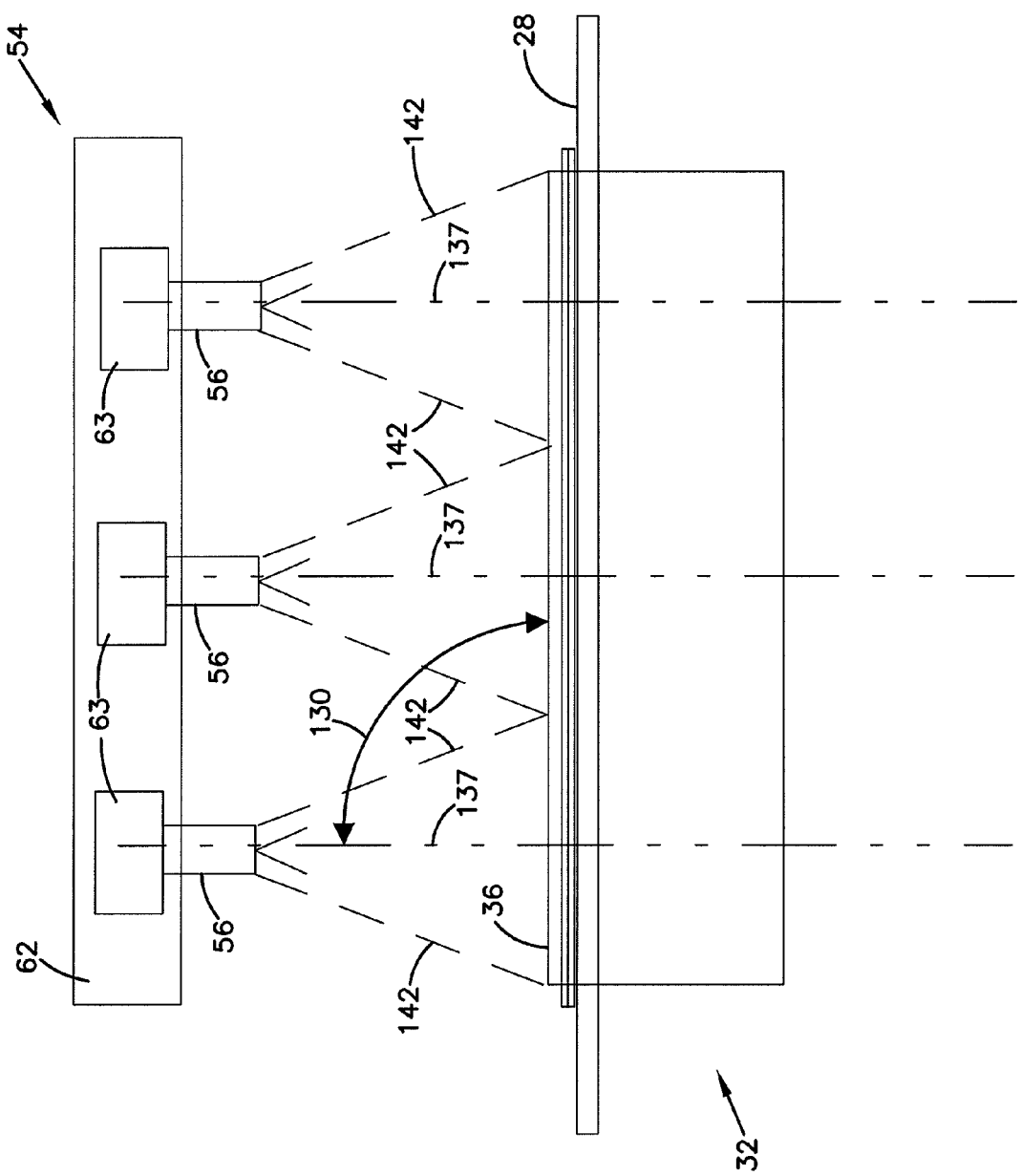
FIG. 8 is a schematic diagram illustrating a reverse pulse cleaning arrangement of the dust collector of FIGS. 1-4.
Figure 10:
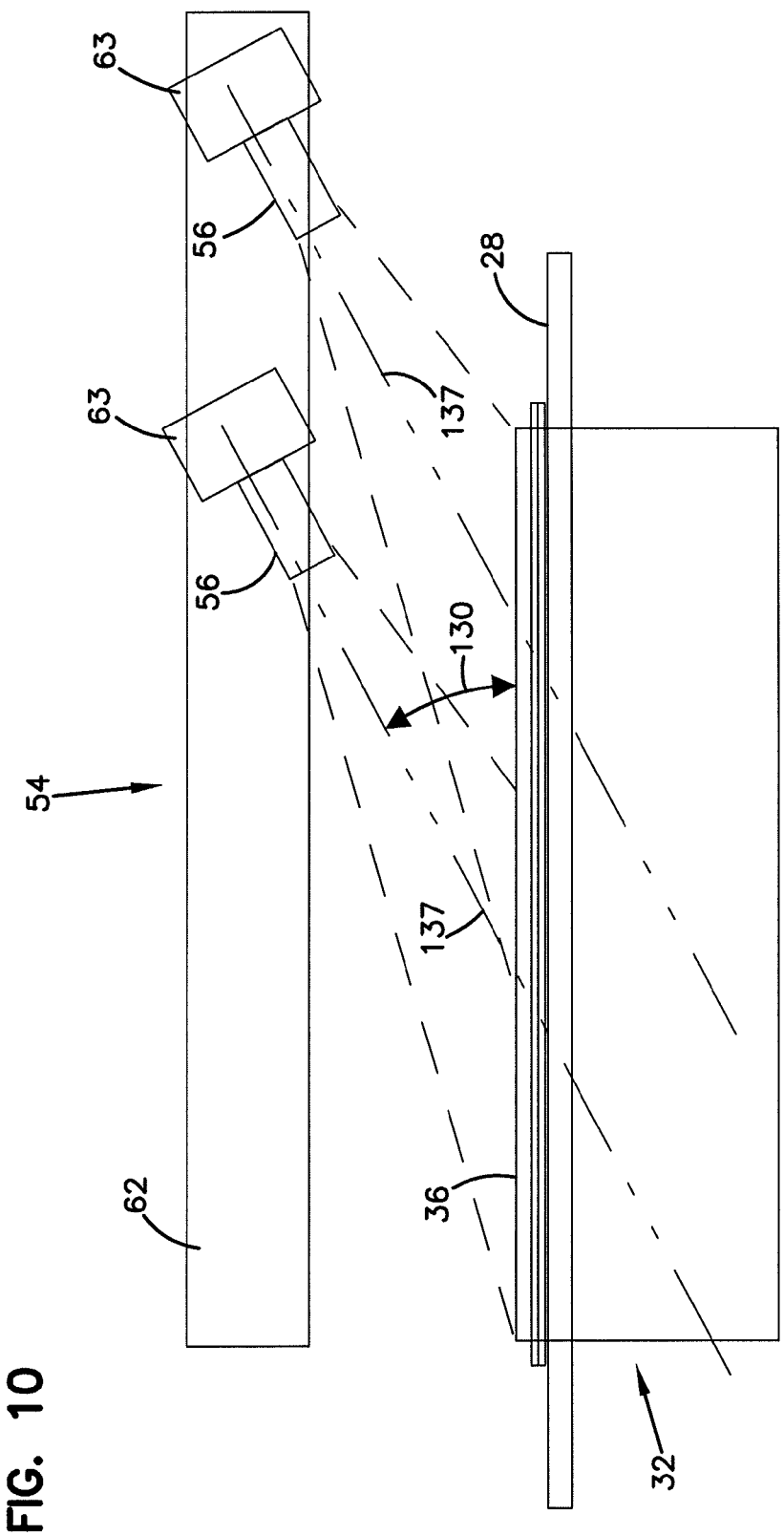
FIG. 10 is a schematic diagram of another alternative embodiment of a reverse pulse cleaning arrangement that could be used in the dust collector of FIGS. 1-4.

Attention is directed to FIGS. 8-10, which illustrate, schematically, the filter element 32 installed against a tubesheet 28, and a reverse pulse cleaning arrangement 54 located to reverse pulse clean the filter element 32.

In FIGS. 8-10, the angle of the pulse is shown generally at 130. FIG. 9 shows an example distance 132 from the blow pipe 56 to the downstream flow face 36 at the pulse center line 137. The pulse target 133 is shown, relative to the filter element 32, expressed as a distance from the end 138 of the filter element 32 closed to the blow pipe 56. The filter width 134 is shown in FIG. 9A. The filter length can be seen in FIG. 9 at 135. The center line of the pulse is shown at 137. The pulse expansion zone is shown at 142.

These factors, in addition to others, can be used to calculate an effective number of blow pipes usable in the reverse pulse cleaning arrangement 54. Other factors considered include the pulse over coverage ($P_{OC}$). The pulse over coverage, $P_{OC}$, is the amount of area, expressed as a number less than 1, which is the maximum amount of area that a person wants to have overlapped by pulses. If this number is too great, than a person would be wasting equipment by having too many blow pipes, and this could lead to damage to the filter element 34. For example, a person could desire no more than 9% of the downstream flow face 36 be overlapping by adjacent pulses. This would expressed as a $P_{OC}$ of 0.09, the 9% figure expressed as a decimal.

Another factor that is used to calculate an effective number of blow pipes is the maximum pulse non-coverage ($P_{NC}$). The maximum pulse non-coverage is the maximum amount of area of the downstream flow face 36 that a person can tolerate of not being hit with a pulse. This will typically be expressed as a percentage. So, for example, if a person desires no more than 10% of the downstream flow face 36 is hit with a pulse, the $P_{NC}$ would be 10.

Based on these factors, the number of blow pipes 56, expressed as the letter Q can be calculated to result in an arrangement with advantages. Q is the number of blow pipes to be used for each individual filter element 32. Q will be an integer of at least 2 or greater, and:

$$Q = L_f/(W_f + 2 \cdot P_{OC}) \cdot (1 + (P_{NC}/100)))) \text{ and wherein}$$

$P_{OC}$=pulse over coverage
$P_{NC}$=maximum pulse non-coverage
$L_f$=filter element length
$W_f$=filter element width In addition, the distance $L_{dd}$ of each of the blow pipes 56 can be calculated. Specifically, $L_{dd}$=length design distance between the exhaust of the blowpipe and the downstream flow face of the filter element at the pulse centerline and $$L_{dd} = (((W_f + (2 \cdot P_{OC})) - D_{bp}/2) \cdot (1/(\text{TAN}(((A_s - A_{SCA}) + A_{TOL})/2))))$$

$D_{bp}$=blow pipe diameter
$A_s$=the splitter angle
$A_{SCA}$=the splitter correction angle, based on testing, for best results; this ranges from 0° to 10°; in one example, $A_{SCA}$ is about 8-9°;
$A_{TOL}$=tolerance for manufacturing In FIGS. 9 and 10, the pulse angle 130 is shown to be non-orthogonal. It has been found that an angle of at least 20 degrees, at in particular, 40-50 degrees, provides advantage. The pulses of compressed air do not have to occur simultaneously, and can be pulsed separately. As can be appreciated, the direction of the multiple pulses can be from parallel to opposing, and can overlap. The distance from the end of the blow pipe 56 to the downstream flow face 36 can range from 2.8-5.8×inside diameter of the blow pipe 56. Advantageous benefit is achieved when this distance is in the range of 3.1-5.0×inside diameter of the blow pipe 56. Preferably, when this distance is in the range of 3.7-3.8, advantages are achieved. In some arrangements, a splitter 64 will not be used. In such arrangements, the distance from the blow pipe 56 to the downstream flow face 36 will vary. This distance can range from 6.1-11.5×inside diameter of the blow pipe 56. Preferably, advantages are achieved when this distance is in the range of 6.4-9.6×inside diameter of the blow pipe 56. Advantages are achieved when this distance is in the range of 6.8-7.2.

The above specification, examples and data provide a complete description of the manufacture and use of the invention. Many embodiments of the invention can be made.

What is claimed is:
1. A dust collector comprising:
   (a) a housing having a dirty air chamber, a filtered air chamber, a tubesheet between the dirty air chamber and the filtered air chamber, a dirty air inlet in communication with the dirty air chamber, and a clean air outlet in communication with the filtered air chamber; the tubesheet having at least one aperture;
   (b) a filter element removably sealed within the at least one aperture in the tubesheet; the filter element removing at least some contaminant from an airstream as it flows from the dirty air inlet, into the dirty air chamber, through the filter element, and into the filtered air chamber;
      (i) the filter element comprising a panel of filter media having an upstream flow face and an opposite downstream flow face; unfiltered air flowing from the dirty air chamber through the upstream flow face and into the filter media; filtered air exiting the filter element in a straight-flow manner through the downstream flow face to flow into the filtered air chamber;
      (ii) the filter element having a length $L_f$ and a width $W_f$;
   (c) a reverse pulse cleaning arrangement constructed and arranged to periodically emit a pulse of gas into the downstream flow face of the filter element to exit through the upstream flow face; the reverse pulse cleaning arrangement including:
      at least Q number of blowpipes directed at the filter element to periodically emit the gas pulses into the downstream flow face of the filter element; wherein Q is an integer at least 2 or greater, and

$Q=L_f/((W_f+2*P_{OC})*(1+P_{NC}/100))))$ and wherein $P_{OC}$=pulse over coverage, and
      $P_{NC}$=maximum pulse non-coverage; and
      (ii) the filter element being accumulator-free.
2. A dust collector according to claim 1 wherein:
   (a) each of the Q blowpipes is directed normal to the downstream flow face.
3. A dust collector according to claim 1 wherein:
   (a) each of the blowpipes includes a splitter to divide the emitted pulse.
4. A dust collector according to claim 1 wherein:
   (a) each of the blowpipes being slotted to generate a pulse shape with a non-circular cross-section.
5. A dust collector according to claim 1 wherein:
   (a) each of the Q blowpipes is directed at a non-orthogonal angle to the downstream flow face.
6. A dust collector according to claim 5 wherein:
   (a) the non-orthogonal angle is at least 20 degrees.

7. A dust collector according to claim 1 wherein:
   (a) Q is at least 3 comprising a first, second, and third blowpipe;
   (b) the first blowpipe is directed normal to the downstream flow face; and
   (c) the second and third blowpipes are directed at a non-orthogonal angle to the downstream flow face; the first blowpipe being between the second and third blowpipes.
8. A dust collector according to claim 1 wherein:
   (a) each of the Q blowpipes is spaced a distance $L_{dd}$ from the downstream flow face of the filter element, wherein:

$L_{dd}=(((W_f+(2*P_{OC}))-D_{bp}/2)*(1/(TAN(((A_s-A_{SCA})+A_{TOL})/2)))$, and $D_{bp}$=blow pipe diameter;
   $A_s$=the splitter angle;
   $A_{SCA}$=the splitter correction angle; and
   $A_{TOL}$=tolerance for manufacturing.
9. A dust collector according to claim 1 wherein:
   (a) the tubesheet has a plurality of apertures;
   (b) there are a plurality of filter elements, one filter element removably sealed within each aperture; each filter element having a length $L_f$ and a width $W_f$; and
   (c) the reverse pulse cleaning arrangement includes at least Q number of blowpipes per filter element directed at each selected filter element to periodically emit the gas pulses into the downstream flow face of the filter element; wherein Q is an integer at least 2 or greater, and $Q=L_f/((W_f+2*P_{OC})*(1+(P_{NC}/100))))$ and wherein $P_{OC}$=pulse over coverage, and
   $P_{NC}$=maximum pulse non-coverage; and
   (ii) each filter element is accumulator-free.
10. A dust collector according to claim 1 wherein:
    (a) the filter media comprises z-media having a fluted sheet secured to a facing sheet to form inlet flutes adjacent to the upstream flow face and outlet flutes adjacent to the downstream flow face.
11. A dust collector according to claim 1 wherein:
    (a) the filter media comprises pleated media.
12. A method of filtering air using a dust collector; the method comprising:
    (a) directing unfiltered air into a dirty air inlet of a dust collector and into a dirty air chamber;
    (b) directing the unfiltered air through a filter element comprising z-media having an upstream flow face and a downstream flow face to result in filtered air; the filter element having a length $L_f$ and a width $W_f$;
    (c) directing filtered air into a filtered air chamber and then out of the dust collector through a clean air outlet; and
    (d) periodically pulsing a jet of compressed gas through the downstream flow face with Q number of blowpipes directed at the downstream flow face, wherein Q is an integer at least 2 or greater, and $Q=L_f/((W_f+2*P_{OC})*(1+(P_{NC}/100))))$ and wherein $P_{OC}$=pulse over coverage, and
    $P_{NC}$=maximum pulse non-coverage; and
    (ii) the filter element is accumulator-free.

* * * * *